United States Patent [19]

Stephenson, III

[11] Patent Number: 5,300,974
[45] Date of Patent: Apr. 5, 1994

[54] SYSTEM AND APPARATUS FOR ACCOMODATING USER PREFERENCES IN REPRODUCED IMAGES

[75] Inventor: Stanley W. Stephenson, III, Spencerport, N.Y.

[73] Assignee: Eastman Kodak Company, Rochester, N.Y.

[21] Appl. No.: 89,162

[22] Filed: Jul. 8, 1993

[51] Int. Cl.⁵ ...................... G03B 17/24; G03B 29/00
[52] U.S. Cl. ...................................... 354/75; 354/105
[58] Field of Search ................... 354/75, 76, 105, 106

[56] References Cited

U.S. PATENT DOCUMENTS

| | | | |
|---|---|---|---|
| 3,490,844 | 1/1970 | Sapp | 355/40 |
| 4,511,229 | 4/1985 | Schwartz et al. | 354/20 |
| 4,576,904 | 3/1986 | Anitole | 354/75 |
| 4,728,978 | 3/1988 | Inoue et al. | 354/289.1 |
| 4,811,042 | 3/1989 | Cloutier et al. | 354/410 |
| 4,975,732 | 12/1990 | Robison et al. | 355/40 |
| 5,016,039 | 5/1991 | Sosa et al. | 354/430 |
| 5,021,820 | 6/1991 | Robison et al. | 355/40 |
| 5,053,879 | 10/1991 | Kubota | 358/244 |
| 5,227,823 | 7/1993 | Shigaki | 354/106 |

Primary Examiner—Michael L. Gellner
Assistant Examiner—Nicholas J. Tuccillo
Attorney, Agent, or Firm—Francis H. Boos, Jr.

[57] ABSTRACT

Apparatus for determining camera user's preference in reproduced images includes a display of a series of images with varying color balance characteristic and means to record color balance preference data associated with a user-selected image. The data is stored and transferred, along with camera film bearing images of scenes taken by the camera user, to the photofinisher for use in controlling reproduction of the image prints in accordance with the image preference data. The data may be stored on a storage medium, such as a memory card, for direct transfer to the photofinisher or it may be stored in a camera internal memory for recording on the film medium, the latter approach assuring the preference data is available at the printer for use in the image reproduction process.

7 Claims, 1 Drawing Sheet

SYSTEM AND APPARATUS FOR ACCOMODATING USER PREFERENCES IN REPRODUCED IMAGES

FIELD OF INVENTION

This invention relates to the field of photographic image reproduction and more particularly to apparatus used in determining certain image characteristics to be used in controlling reproduction of the photographic images.

BACKGROUND

In photographic systems, a camera user captures the scene on a photosensitive film strip that is subsequently processed to create a stable record of the image, a "negative". This negative is then exposed in a photographic printing process onto a positive print paper to produce a positive image for normal, direct viewing. The quality of the resultant print depends on many variables involved in this technology; namely, light density and hue of the image, sensitivity of the emulsions and user preferences in color balance and density characteristics. Typically, these variables are dealt with in the printing stage by selectively controlling the duration of exposure for each of a plurality of colors of the light exposing the print paper. These controls may be inputted manually by the operator of photographic printer or they may be determined automatically using specially designed computer algorithms for the purpose.

Testing has shown that when a series of scenes are shown to a variety of viewers, the viewers express different preferences on color balance and exposure characteristics of the print. Some individuals prefer a color mix that is biased more toward the longer wave lengths in the red spectral wavelength region to produce a "warmer" image. Others may prefer a color bias toward shorter wavelengths in the blue spectral region. Normally, however, photographic printing processes, including the associated color balance control algorithms, when used, are set to generate prints that are based on a derived average preference of a wide variety of users.

It would be of benefit to camera users if their personal preferences as to color balance characteristics in reproduced image characteristics could be determined individually and the preference applied to the printing process to control the exposure of the prints.

SUMMARY OF THE INVENTION

In accordance with the invention, therefore, there is provided photographic image preference determining apparatus for operation by a camera user in determining preferences for reproduction of scene images captured on film by the camera user, wherein the apparatus comprises, in part, display means for presenting a plurality of user-selectable images of at least one scene type, the images having progressively different color balance characteristics and means operable by the user for selecting an image having color balance characteristics that are preferred by the camera user for the scene type being presented in the display means. The preference determining apparatus of the invention further includes means for generating data representing the user's selected image color balance preference and means for outputting said data to a storage medium for transfer with the user's exposed film to a photofinishing operation for use in reproducing images from the film in accordance with the color balance preferences of the camera user.

In a more comprehensive sense, the invention comprises a scene image capture and reproducing system for reproducing images of captured scenes in which the reproduced image incorporates color balance adjustment in accordance with a user's viewing preference. The system of the invention comprises, in part, the preference determining apparatus described above and further includes photographic camera apparatus for capturing an image of a scene, the camera having data input and storage means for receiving and storing the image preference data from the preference determining apparatus in association with the film used for image capture in the camera. The system further includes image reproducing means for receiving the captured scene image and the stored image preference data for producing positive images therefrom with adjusted color balance characteristics in accordance with image preference data.

It will be appreciated that by providing the capability to allow a camera user to determine his or her image preferences for color balance in a reproduce image and by providing a means by which the preference data can be stored and communicated to the photofinishing printer for use in controlling the reproduction of the positive prints, the user's satisfaction with the resultant image can be significantly enhanced.

DETAILED DESCRIPTION

Figure 1:
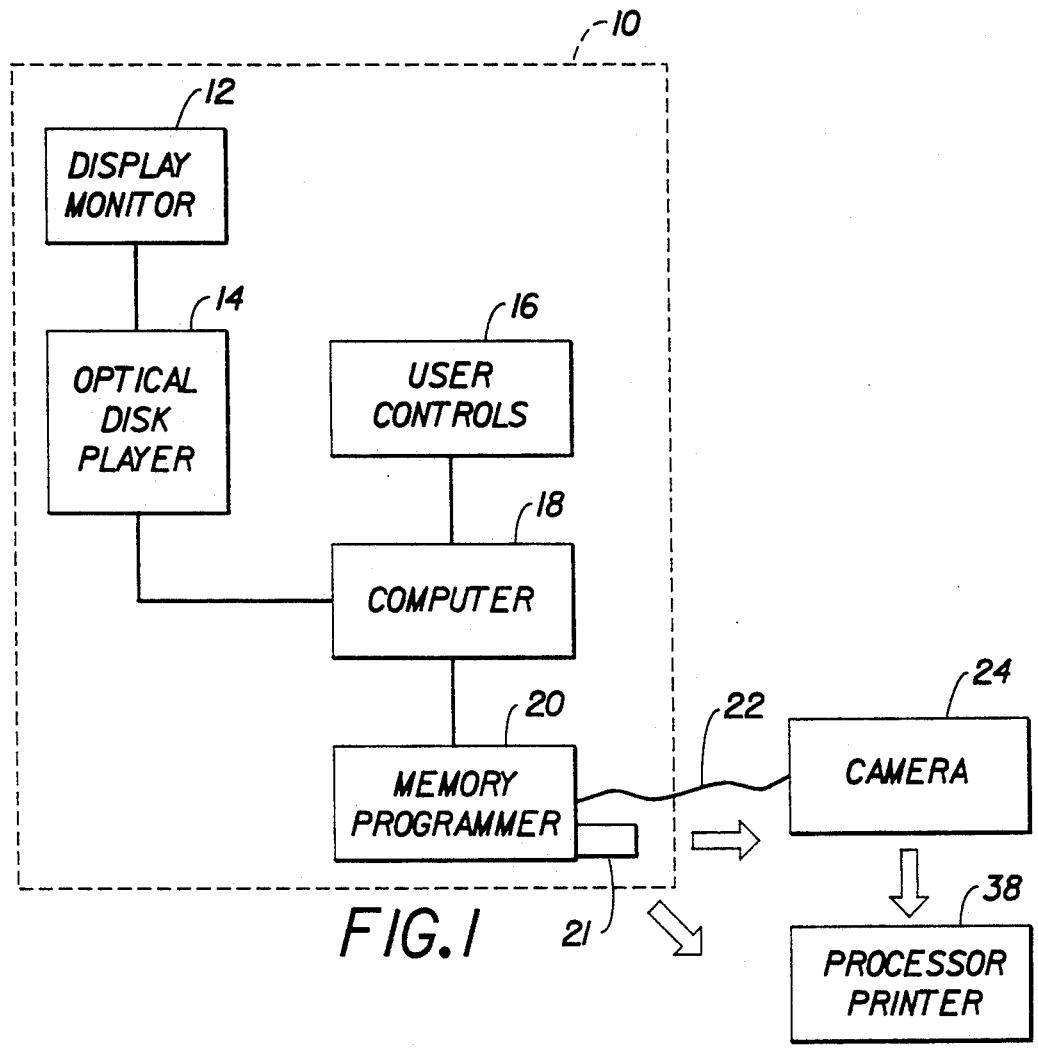
FIG. 1 is a functional schematic diagram of the system of the present invention.

Referring to FIG. 1, there is shown a user interactive station 10 adapted to determine a camera user's preferences for reproduction of scene images captured on film. The station 10 is comprised of display means, including display monitor 12 and an optical disk player 14, for presenting a plurality of user-selectable test images of a least one scene type, wherein the images have progressively different color balance characteristics.

The test images are recorded on one or more optical disks located in the optical disk player 14. Such images might be comprised of a small number of scene types, e.g. from one to five, that represent a range of typical photographed scenes. For each scene, a reference image is provided that represents how the image would appear when reproduced using normal photographic printing color balance and exposure control algorithms in the photofinishing printer. This reference image is replicated on the optical disk for display with variations in each of three color parameters consisting of red balance, green balance and blue balance. The progressively different color balance might, for example, be comprised of 5% step variations ranging from a +10% increase to a −10% decrease from the reference color value used in the reference image. This would result in five density levels for each of the three color parameters, giving 125 color balances for each scene, a total of 625 images for the five scene types.

The station 10 further includes user controls 16 comprising user operable control means such as knobs, buttons or a keyboard, for selecting a particular image, from each of the one or more available scene types, that has color balance characteristics that are preferred by the camera user for the scene type presented on the display means. A computer 18 is provided for controlling the operation of the optical disk player 14 and for generating data representing the user's selected image color balance preference.

Figure 2:
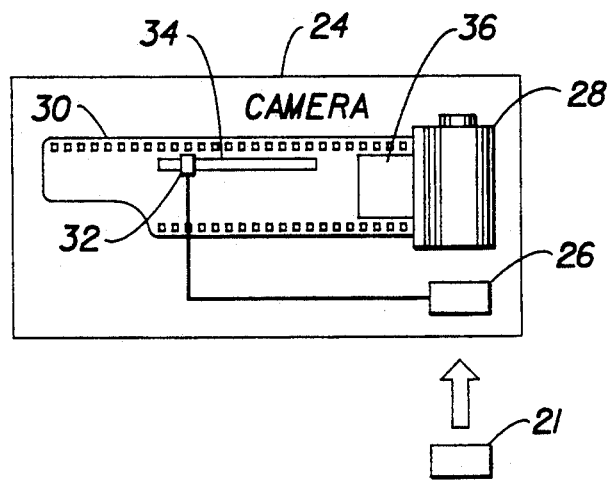
FIG. 2 is schematic representation of a camera adapted for magnetic recording of data on photographic film and capable of recording image preference data thereon in accordance with a feature of the invention.

A memory programmer 20 is included in the station and comprises means for outputting the data generated in computer 18 to a storage medium for transfer with the user's film to a photofinishing operation for use in reproducing images from the film in accordance with the color balance preferences selected in station 10 by the user. The memory programmer 20 operates to magnetically record data onto a memory card 21 which is removable for transfer to a camera 24. In this arrangement, as seen in FIG. 2, camera 24 is adapted to receive the memory card 21 to read and store the data from the card in RAM memory of a microprocessor 26. Preferably, the camera is further adapted to receive a film cartridge 28 having film strip 30 on which a virtually transparent coating of magnetic material is disposed for recording of data on the film in the manner described in commonly assigned U.S. Pat. No. 4,974,096, the disclosure of which is incorporated herein by reference. In the illustrated embodiment, the data is recorded by a magnetic record head 32 on a data track 34 located in the leader portion of the film strip 30 ahead of the first image area 36. However, it will be appreciated that the recording may be made on tracks alongside the image frames or on the trailer portion of the film.

When the film is fully exposed and sent to the photofinisher for processing and printing represented by unit 38, the printer, which is provided with a magnetic data read circuits, reads the data on track 34 and inputs the appropriate adjustment values to the printer exposure algorithm to cause the images to be printed with the color balance adjustment selected by the camera user at the station 10.

An alternative to recording of the data on the film would be to send the memory card 21 directly to the photofinisher along with the film. The data would then be read at the printer from the memory card for controlling of the printer operation and the card returning with the processed film and prints. A further alternative to the use of a memory card would be to provide a data communication cable 22 which could be plugged in to the camera for direct transfer of the data from programmer 20 to the RAM memory in the camera for storage in the camera. Preferably, the RAM memory in the camera is a non-volatile memory of known type thus providing long term data storage to allow recording of the preference data on successive film strips without the need for repeated access to the user preference determining station 10. An alternative to magnetic recording on the film is the use of optical data recording utilizing, for example, light emitting diodes to record the data as latent images on the film in the form of blips or bar codes located in a non-image frame area of the film. In the latter event, the photofinishing printer apparatus would be provided with optical reader devices to read the optical data on the developed film strips during the printing operation.

It will be appreciated from the foregoing that what has been described is a convenient arrangement allowing camera users to determine their preference in image color balance and record the resulting data so that the data can be employed at the printer to achieve the customized printing of the images. Such an arrangement provides enhanced customer satisfaction with the resulting prints.

The invention has been described in detail with particular reference to a presently preferred embodiment, but it will be understood that variations and modifications can be effected within the scope of the invention as set forth in the claims appended hereto.

What is claimed is:

1. Photographic image preference determining apparatus for operation by a camera user in determining preferences for reproduction of scene images captured on film by the camera user, the apparatus comprising:

display means for presenting a plurality of user-selectable test images of at least one representative scene type, the test images corresponding to a scene type having progressively different color balance characteristics;

means operable by the user for selecting a test image having color balance characteristics that are preferred by the camera user for the scene type being presented in the display means;

means for generating data representing the user's selected image color balance preference; and means for outputting said data to a storage medium for transfer with the user's exposed film to a photofinishing operation for use in reproducing images from the film in accordance with the color balance preferences of the camera user.

2. The apparatus of claim 1 wherein said display means is adapted to display groups of test images for each of a plurality of representative scene types, each group being comprised of a plurality of test images having progressively different color balance charateristics.

3. The apparatus of claim 1 wherein said test images are grouped as a plurality of replicated images for a scene type, the plurality of images within a group including a reference image having reference color values providing a color balance characteristic representive of how the image would appear with normal printing of the image and with two or more other images that represent both an increase and a decrease in color value from the corresponding color value in the reference image for at least one spectral color.

4. The apparatus of claim 1 wherein said outputting means includes a memory card data recorder and said storage means comprises a removable memory card.

5. The apparatus of claim 1 wherein said outputting means includes a data communication coupling adapted to couple data to a camera storage means.

6. Photographic system for producing photographic prints with image characteristics incorporating a camera user's preferences, the system comprising:

a user-interactive station having means for presenting user selectable images with progressively different color balance characteristics from which the user may select an image having color balance characteristics representing the user's preference in reproduced prints and having means for generating image preference data representative of said user-selected preferences in color balance characteristics;

means for outputting said image preference data to storage means in a photographic camera;

camera means for capturing scene images on photographic film and including data storage and recording means for storing said preference data from the user-interactive station and for recording the data onto the photographic film;

and printer means for producing positive prints from said film images and including means for reading the preference data from the film and for controlling the printing process in accordance with the image preference data.

7. Photographic scene image capture and reproducing system for reproducing images of captured scenes in which the reproduced image incorporates color balance adjustment in accordance with a user's viewing preference, the system comprising:

camera apparatus for capturing an image of a scene, the apparatus having data input and storage means;

a user-interactive station including (a) means for presenting a sequence of user selectable images having progressively different color balance characteristics, (b) means operable by the user for selecting an image having a preferred color balance characteristic and (c) means for generating data representing the user's color balance preference in reproduced images;

means for transferring said image preference data to said image capture apparatus for storage therein; and image reproducing means for receiving image information and said image preference data and for producing positive images with adjusted color balance characteristics in accordance with said image preference data.

* * * * *